(12) United States Patent
Oba

(10) Patent No.: US 6,190,227 B1
(45) Date of Patent: Feb. 20, 2001

(54) INCOMING CALL REPORTING TOY

(75) Inventor: Jun Oba, Tokyo (JP)

(73) Assignee: Jun Planning Co., Inc., Tokyo (JP)

(*) Notice: Under 35 U.S.C. 154(b), the term of this patent shall be extended for 0 days.

(21) Appl. No.: 09/373,583

(22) Filed: Aug. 13, 1999

(51) Int. Cl.[7] .............................. A63H 5/00; A63H 33/26; H04M 1/00
(52) U.S. Cl. .............................. 446/81; 446/485; 379/434
(58) Field of Search .............................. 446/81, 175, 485, 446/141, 142, 484; D14/143; D21/111; 379/434

(56) References Cited

U.S. PATENT DOCUMENTS

| D. 250,023 | * | 10/1978 | Perkins et al. | ...................... D14/143 |
| D. 281,496 | * | 11/1985 | Chen | ...................... D14/143 |
| D. 319,231 | * | 8/1991 | Plunkett et al. | ...................... D14/143 |
| 2,273,836 | * | 2/1942 | Dale | ...................... 446/485 X |
| 4,087,650 | * | 5/1978 | Tucker | ...................... 379/434 X |
| 5,609,508 | * | 3/1997 | Wingate | ...................... 446/142 |

* cited by examiner

*Primary Examiner*—D. Neal Muir
(74) *Attorney, Agent, or Firm*—Jacobson, Price, Holman & Stern, PLLC

(57) ABSTRACT

An incoming call reporting toy that visually or aurally reports a call arrival state of a portable terminal to a person around the toy in an amusing fashion. An electromagnetic wave emitted when a portable terminal receives an incoming call is used to activate an incoming call reporting circuit incorporated in the toy body. A signal outputted from a signal controller configuring the incoming call reporting circuit drives a motor to allow the toy body to perform a predetermined operation while emitting a sound and/or light, thereby notifying a person around the toy of the arrival of the call at the portable terminal.

10 Claims, 3 Drawing Sheets

INCOMING CALL REPORTING TOY

FIELD OF THE INVENTION

The present invention relates to an incoming call reporting toy for indicating a call arrival state of a portable terminal represented by a cellular telephone so that the call is visually and aurally reported in an amusing fashion to a person around the toy.

BACKGROUND OF THE INVENTION

Generally speaking, upon receiving an incoming call, a portable terminal, such as a cellular telephone, outputs a ring tone or vibrates to inform the user of the incoming call. This ring tone, however, is feeble, so the terminal in effect fails to notify the user of the call arrival state if, for example, the user is indoors away from the portable terminal. In addition, in the case of a mechanism for causing vibration to inform the user of the incoming call, the user fails to notice the call unless the mechanism remains in contact with the user.

In addition, a reporting device has been developed that includes an LED to be mounted at the top of an antenna provided on a portable terminal so that a response signal (an electromagnetic wave) emitted by the terminal upon receiving an incoming call is used to light the LED in order to optically inform the user of the incoming call. A problem with this reporting device is that the incoming call notifying signal displayed by the LED is so unstable that it lights for only a short period of time during which the portable terminal is emitting the response signal.

As described above, a problem of the conventional portable terminal is that the user fails to notice an incoming call in a timely manner if the user is indoors away from the portable terminal or if the user separates the terminal from his or her body. The conventional reporting means also lacks an element of fun, so an interesting incoming call reporting means is desired.

SUMMARY OF THE INVENTION

Thus, an object of this invention is to solve the problems of the above conventional incoming call reporting means and to provide an interesting incoming call reporting toy adapted so that when a portable terminal enters a call arrival state, a toy body such as a stuffed doll, performs a predetermined operation while emitting a sound such as a melody, music, etc. or lights an LED in order to visually and aurally notify a person around the toy of the incoming call in an amusing fashion.

A configuration of this invention provided to attain this object will be described in detail. An aspect of this invention is an incoming call reporting toy, which is configured to use an electromagnetic wave emitted by a portable terminal upon receiving an incoming call in order to drive an incoming call reporting circuit incorporated in a toy body, such as a stuffed doll, so that the toy body performs a predetermined operation while emitting a sound and/or light to visually and aurally report to a person around the toy that the portable terminal has received the incoming call.

Another aspect of this invention is an incoming call reporting toy including a holder for the portable terminal attached to the toy body.

Furthermore, still another aspect of this invention is an incoming call reporting toy which is configured so that after the portable terminal has received an incoming call, the toy body continues the incoming call reporting operation when the portable terminal is removed from the holder mounted on the toy body and is separated therefrom over a specified distance and the incoming call reporting circuit incorporated in the toy body is automatically opened to stop the operation.

According to this invention, by installing the portable terminal in the holder mounted on the toy body, such as a stuffed doll, an electromagnetic wave excited by the antenna when the terminal receives an incoming call is induced by a matching circuit comprising a coil and capacitors and is detected by a detecting circuit and amplified by an amplifier.

Subsequently, the signal is inputted to a control circuit via a chattering preventing circuit in the incoming call reporting circuit to control a sound synthesizing ROM and a motor for driving the toy body. In some cases, a control signal outputted from a signal controller controls the light emitting diode (LED). Then, the toy body, such as a stuffed doll, performs an operation such as a specified dance while emitting a sound such as a melody and/or a light in order to report the arrival of the call at the terminal to a person around the toy in an amusing fashion.

As regards this, the electromagnetic wave from the portable terminal is inversely proportional to the square of the distance. Thus, by mounting the terminal in the holder mounted on the toy body, the toy is ensured to start the operation upon the reception of an incoming call, and when the portable terminal is removed from the holder, the electric field is rapidly weakened to automatically stop the operation. As a result, a battery power supply is effectively prevented from exhaustion.

BRIEF DESCRIPTION OF THE DRAWINGS

A specific configuration of an incoming call reporting toy according to this invention will be described in detail based on the illustrated embodiment.

DETAILED DESCRIPTION OF THE PREFERRED EMBODIMENTS

In the figures, toy body 1 comprises a stuffed doll formed like an animal or other doll, as appropriate, and holder 2 is mounted on the front surface of the toy body 1. A top surface of the holder 2 is open. A portable terminal 3, such as a cellular telephone, is removably installed in holder 2. An incoming call reporting circuit 4 is disposed in the toy body 1.

Although the illustrated embodiment describes the toy body as a stuffed doll formed like an animal, it may be of course changed to another external form such as a toy car or a toy alarm clock and may reasonably comprise a material other than fibers such as clothes, for example, a synthetic resin or metal.

The incoming call reporting toy according to this invention uses an electromagnetic wave simultaneously emitted by the portable terminal 3 with the arrival of a call at the portable terminal 3 in order to drive the incoming call reporting circuit 4 incorporated in the toy body 1 so that the toy body 1 performs a predetermined operation while emitting a sound and/or a light, thereby visually and aurally reporting to a person around the toy that the portable terminal 3 has received the incoming call. The incoming call reporting circuit 4 will be configured as described below.

Figure 1:
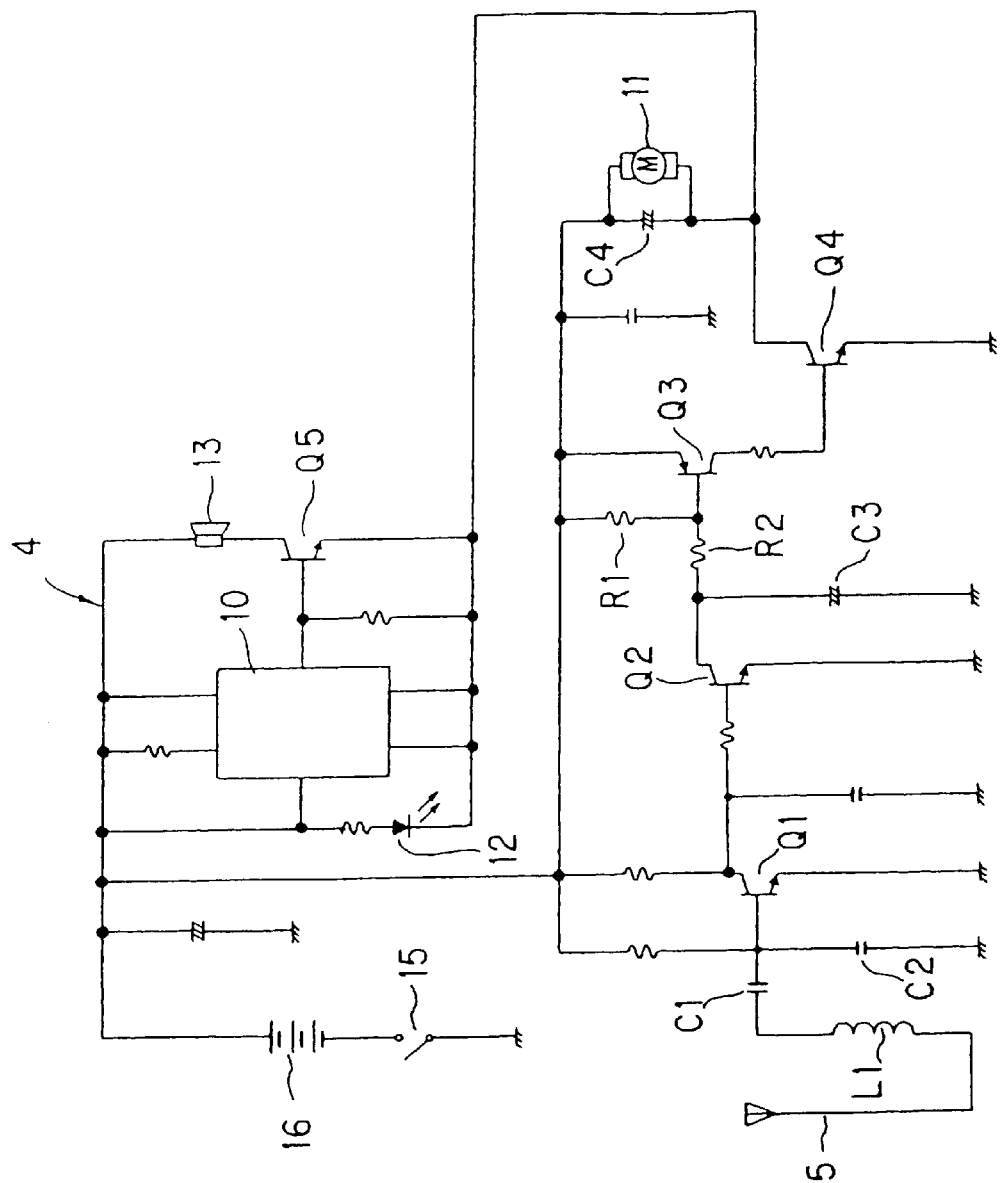
FIG. 1 is a circuit diagram showing an example of an incoming call reporting circuit incorporated in the body of an incoming call reporting toy according to this invention.
Figure 2:
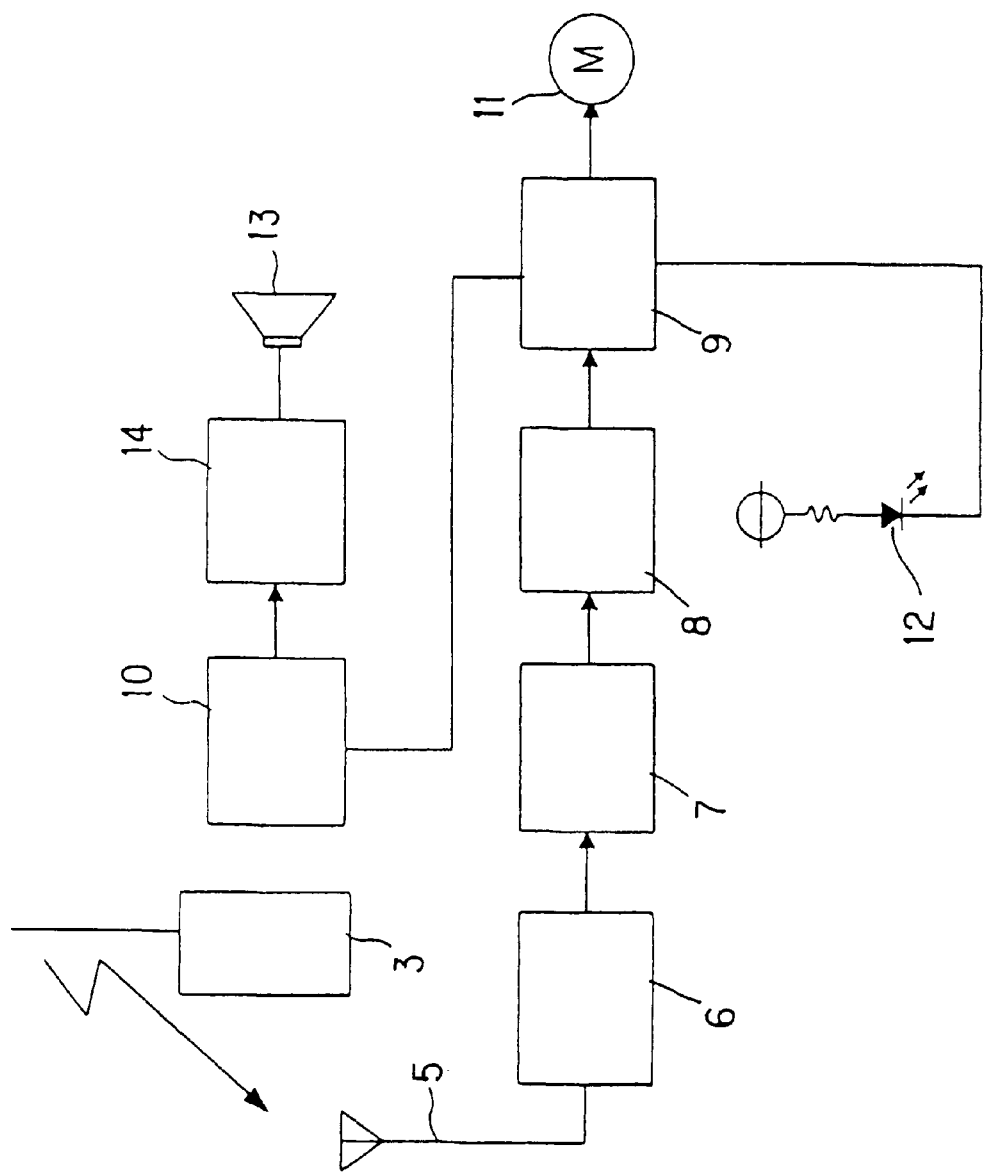
FIG. 2 is a block diagram showing an example of the incoming call reporting circuit.
Figure 3:
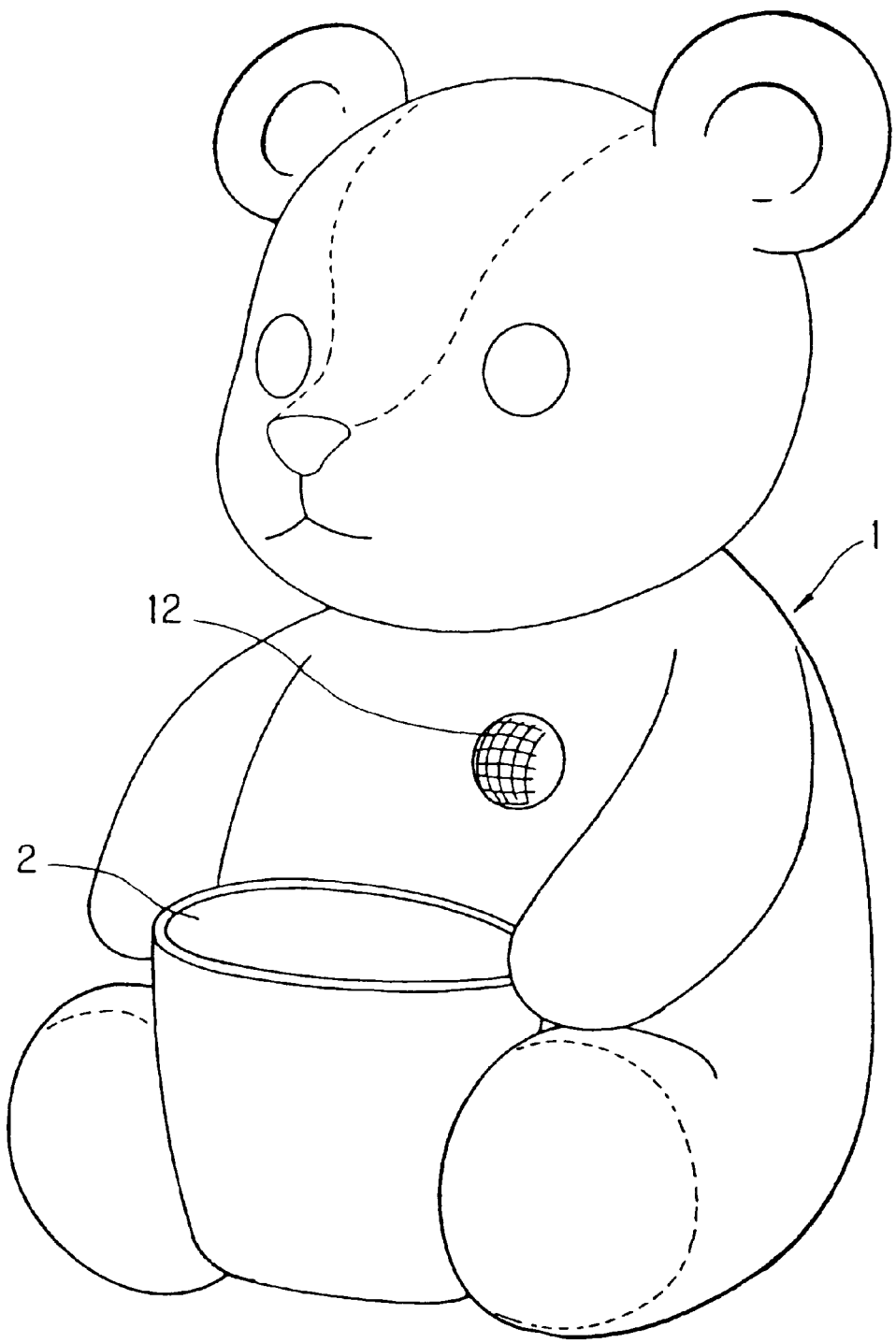
FIG. 3 is a perspective view showing an example of the toy body.

In FIGS. 1 and 2, an antenna line 5 excites an electromagnetic wave that is radiated by the portable terminal 3 upon receiving an incoming call. A matching circuit 6 is configured by a coil L1 and capacitors C1, C2 for efficiently inducing the electromagnetic wave excited by the antenna line 5. A detecting circuit 7 is configured by a transistor Q1 to deliver a signal to the subsequent circuit if it detects an electromagnetic wave of an intensity exceeding a certain level.

An amplifying circuit 8 is configured by a transistor Q2 to amplify the electromagnetic wave detected by the detecting circuit 7. Subsequently, the wave passes through a chattering preventing circuit configured by resistors R1, R2 and a capacitor C3 and is then inputted to a signal controller 9 composed of a switching transistor Q3 and a driver transistor Q4.

A signal outputted from the signal controller 9 controls a sound synthesizing ROM 10 of a re-trigger type and a motor 11 for driving the stuffed doll body 1. In addition, this signal controls a light emitter 12 comprising an LED connected to the signal controller 9. A sound signal from the sound synthesizing ROM 10 is outputted through a speaker 13, and a driver 14 configured by a transistor Q5 is mounted before the speaker 13 in order to output a larger sound volume.

Additionally, a unit switch 15 opens and closes the entire incoming call reporting circuit 4 which includes a battery power supply 16. A brush noise preventing capacitor C4 is associated with the motor 11 which drives the toy body 1. The battery power supply 16 is preferably disposed so as to be replaced via a closing cover mounted on, for example, the bottom surface of the toy body 1. The unit switch 15 may be installed unobtrusively, for example, mounted on the rear surface of the toy body 1.

The incoming call reporting toy according to this invention is configured as described above. The portable terminal 3 is housed on the holder 2 mounted on the toy body 1, and the unit switch 15 is turned on. When the unit switch 15 is turned on, the LED 12 lights to inform the user of this situation, and then immediately goes out to enter a standby state.

When a call arrives at the portable terminal 3, a response electric wave emitted by the terminal 3 is excited by the antenna line 5 disposed in the toy body 1, and is induced by the matching circuit 6, detected by the detecting circuit 7, and amplified by a transistor Q2 of the amplifying circuit 8. The amplified signal passes through the chattering preventing circuit and is then inputted to the control circuit configured by transistors Q3 and Q4. A control signal outputted from the signal controller 9 controls the motor 11 to allow the toy body 1 to perform an operation, for example, shaking the entire body via a mechanical transmitting means (not shown).

Simultaneously with this operation, a control signal outputted from the signal controller 9 activates the sound synthesizing ROM 10 to play a specified melody via the speaker 13 while starting to light the LED 12. The series of operations serve to report the arrival of the call at the terminal 3 to the user in an amusing fashion.

As regards this, the electromagnetic wave from the portable terminal is inversely proportional to the square of the distance. Thus, when the portable terminal 3 is removed from the holder 2 of the toy body 1 and separated therefrom over a specified distance, the electric field is rapidly weakened to automatically stop the series of operations.

Therefore, this invention can provide an interesting incoming call reporting toy adapted so that when a portable terminal enters a call arrival state, the toy body automatically performs a predetermined operation while emitting a sound such as a melody or lighting the LED in order to notify a person around the toy of the incoming call in an amusing fashion.

I claim:

1. An incoming call reporting toy comprising:

a toy body, and an incoming call reporting circuit incorporated in the toy body for performing an incoming call reporrting operation to at least one of visually and aurally report to a person around the toy that an incoming call has been received, said incoming call reporting circuit including an antenna for receiving an electromagnetic wave radiated by a portable telephone terminal and a detecting circuit for detecting said electromagnetic wave of an intensity exceeding a predetermined level and for activating said incoming call reporting operation indicative of receipt of said electromagnetic wave of said portable telephone terminal.

2. The incoming call reporting toy according to claim 1, wherein a holder for the portable terminal is attached to the toy body.

3. The incoming call reporting toy according to claim 2, wherein the toy body continues the incoming call reporting operation when the portable terminal is removed from the holder installed on the toy body and is separated therefrom until the portable terminal reaches a specified distance at which point the incoming call reporting circuit is automatically opened to stop the operation.

4. An incoming call reporting toy according to claim 1, wherein said incoming call reporting circuit further includes a matching circuit connected to said antenna, and said detecting circuit is connected to said matching circuit.

5. An incoming call reporting toy according to claim 4, wherein an amplifying circuit amplifies the electromagnetic wave detected by said detecting circuit.

6. An incoming call reporting toy according to claim 5, wherein a chattering preventing circuit receives the electromagnetic wave amplified by said amplifying circuit.

7. An incoming call reporting toy according to claim 6, wherein a signal controller receives the electromagnetic wave from said chattering preventing circuit and generates a signal.

8. An incoming call reporting toy according to claim 7, wherein said signal controls a sound synthesizing ROM.

9. An incoming call reporting toy according to claim 7, wherein said signal controls a motor for moving the toy body.

10. An incoming call reporting toy according to claim 7, wherein said signal controls a light emitter.

* * * * *